US012754498B2

(12) United States Patent
Kasama et al.

(10) Patent No.: US 12,754,498 B2
(45) Date of Patent: Oct. 6, 2026

(54) IMAGE FORMING APPARATUS THAT CONTROLS HEATER OF FIXING DEVICE, ACCORDING TO SIZE OF RECORDING SHEET

(71) Applicant: KYOCERA Document Solutions Inc., Osaka (JP)

(72) Inventors: Kenichi Kasama, Osaka (JP); Ryohei Tokunaga, Osaka (JP); Takashi Miyake, Osaka (JP); Akihiro Kondo, Osaka (JP); Hiroki Kawasaki, Osaka (JP); Shunsaku Fujii, Osaka (JP); Yuto Masaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/246,532

(22) Filed: Jun. 23, 2025

(65) Prior Publication Data

US 2025/0390040 A1 Dec. 25, 2025

(30) Foreign Application Priority Data

Jun. 25, 2024 (JP) ................................ 2024-102409

(51) Int. Cl.
*G03G 15/20* (2006.01)

(52) U.S. Cl.
CPC ..... *G03G 15/2039* (2013.01); *G03G 15/2017* (2013.01); *G03G 15/2064* (2013.01); *G03G 2215/2035* (2013.01)

(58) Field of Classification Search
CPC ........... G03G 15/2042; G03G 15/2039; G03G 2215/2035; G03G 15/2053; G03G 21/206
See application file for complete search history.

(56) References Cited

U.S. PATENT DOCUMENTS

| | | | | |
|---|---|---|---|---|
| 9,081,340 | B2 * | 7/2015 | Suzuki ............... | G03G 15/2042 |
| 2009/0226202 | A1 | 9/2009 | Kinouchi et al. | |
| 2013/0039674 | A1 * | 2/2013 | Takami ............. | G03G 15/2017 399/69 |
| 2014/0023389 | A1 * | 1/2014 | Ono .................. | G03G 15/2017 399/69 |
| 2014/0321873 | A1 * | 10/2014 | Kadowaki .......... | G03G 15/2042 399/92 |
| 2015/0037052 | A1 * | 2/2015 | Muramatsu ........ | G03G 15/2042 399/334 |
| 2016/0306305 | A1 * | 10/2016 | Yamada ............. | G03G 15/2042 |
| 2018/0059590 | A1 | 3/2018 | Suzuki et al. | |

FOREIGN PATENT DOCUMENTS

| | | | |
|---|---|---|---|
| JP | H04307580 | A | 10/1992 |
| JP | 2017044953 | A | 3/2017 |
| JP | 6929033 | B | 9/2021 |

* cited by examiner

*Primary Examiner* — Jessica L Eley
(74) *Attorney, Agent, or Firm* — IP Business Solutions, LLC.

(57) ABSTRACT

A fixing device includes a main heater located at a central portion of a fixing belt in a direction along a rotary shaft, two sub heaters located at respective end portions, and a cooling fan that cools end portions of the heaters. When a recording sheet to undergo a fixing operation is of a size that does not reach a temperature detection position of a temperature sensor, which detects the temperature of the sub heater, a target temperature of the sub heater is set to a higher side, so that the temperature of a sheet passage region is maintained within a temperature range appropriate for the fixing operation.

4 Claims, 9 Drawing Sheets

IMAGE FORMING APPARATUS THAT CONTROLS HEATER OF FIXING DEVICE, ACCORDING TO SIZE OF RECORDING SHEET

INCORPORATION BY REFERENCE

This application claims priority to Japanese Patent Application No. 2024-102409 filed on Jun. 25, 2024, the entire contents of which are incorporated by reference herein.

BACKGROUND

The present disclosure relates to an image forming apparatus, including a fixing device that fixes an image formed on a recording medium, such as a recording sheet, by thermal compression.

Electrophotographic image forming apparatuses include a fixing device that fixes an image formed on a recording medium. Many of the existing fixing devices include a cylindrical fixing belt set to rotate, a presser opposed to the fixing belt so as to define a nip region between the presser and the fixing belt, through which the recording medium to be subjected to the fixing operation passes, and a heater that heats the fixing belt. Such fixing device heats and presses the image formed on the recording medium at the nip region, thereby fixing the image onto the recording medium by thermal compression. In addition, the fixing device generally includes a temperature sensor for detecting the temperature of the heater, for the purpose of maintaining the temperature of the fixing belt that pinches and heats the recording medium at an appropriate temperature. Further, some of such heaters include a main heater located at the central position of the fixing belt in the width direction, and two sub heaters located at the respective end portions of the fixing belt in the width direction, the main heater and the sub heaters being divided along the width direction of the fixing belt.

SUMMARY

The disclosure proposes further improvement of the foregoing technique.

In an aspect, the disclosure provides an image forming apparatus including a fixing device, a first temperature sensor, a second temperature sensor, a cooling mechanism, a controller, and a setting device. The fixing device includes a fixing belt, a presser, and a heater. The fixing belt has a cylindrical shape, and is set to rotate. The presser is opposed to the fixing belt, so as to define a nip region between the presser and the fixing belt, through which a recording medium to undergo a fixing operation passes. The heater extends in a width direction, orthogonal to a rotation direction of the fixing belt, and heats the fixing belt. The heater includes a main heater and two sub heaters, divided in the width direction. The main heater is located at a central portion of the fixing belt in the width direction. The sub heaters are located on respective end portions of the fixing belt in the width direction. The first temperature sensor detects a temperature of the main heater. The second temperature sensor detects a temperature of the sub heater. The cooling mechanism includes a cooling fan, and cools the end portions of the heater in the width direction. The controller controls operation of the cooling fan, controls the main heater so as to adjust a first detected temperature, detected by the first temperature sensor while the cooling fan is operating, to a predetermined first target temperature which is an appropriate fixing temperature, and controls the sub heater so as to adjust a second detected temperature, detected by the second temperature sensor while the cooling fan is operating, to a predetermined second target temperature. The setting device sets the second target temperature to a predetermined first set temperature, when the recording medium is of a large size that reaches a temperature detection position of the second temperature sensor, in the width direction orthogonal to a transport direction of the recording medium, and sets the second target temperature to a predetermined second set temperature higher than the first set temperature, when the size of the recording medium in the width direction is a specific size that reaches a position corresponding to the sub heater in the width direction, but does not reach the temperature detection position of the second temperature sensor in the width direction. The second set temperature corresponds to a predetermined temperature that allows a sheet passage region of the recording medium, reaching the position corresponding to the sub heater in the width direction, to maintain the appropriate fixing temperature.

DETAILED DESCRIPTION

Figure 1:
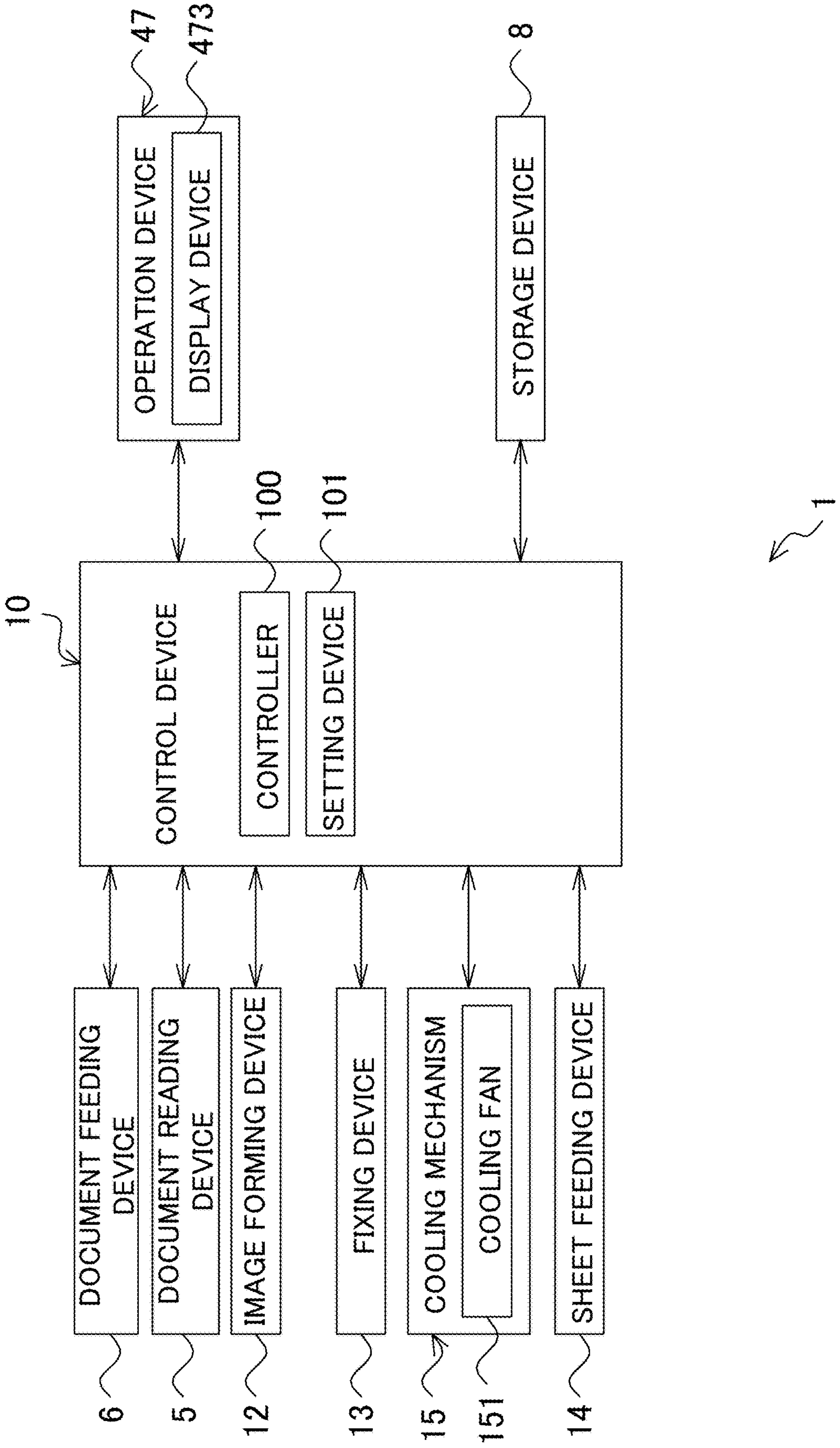
FIG. 1 is a functional block diagram schematically showing an essential internal configuration of an image forming apparatus according to an embodiment of the disclosure.

Hereafter, an image forming apparatus according to an embodiment of the disclosure the disclosure will be described, with reference to the drawings. FIG. 1 is a functional block diagram schematically showing an essential internal configuration of the image forming apparatus according to the embodiment of the disclosure. The image forming apparatus 1 is a multifunction peripheral having a plurality of functions, such as copying, printing, scanning, and facsimile transmission.

The image forming apparatus 1 includes a control device 10, a document feeding device 6, a document reading device 5, an image forming device 12, a fixing device 13, a cooling mechanism 15, a sheet feeding device 14, an operation device 47, and a storage device 8.

The document feeding device 6 is openably connected to the upper face of the document reading device 5, for example via a non-illustrated hinge. The document feeding device 6 serves as a document retention cover, when a document placed on a non-illustrated platen glass is to be read by the document reading device 5. The document feeding device 6 is what is known as an automatic document feeder (ADF), and includes a non-illustrated document tray, to supply the document placed on the document tray to the document reading device 5.

To perform the document reading operation, the image forming apparatus 1 operates as follows. The document reading device 5 optically reads the image on the document delivered from the document feeding device 6 to the document reading device 5, or placed on the platen glass, and generates image data. The image data generated by the document reading device 5 is stored, for example, in a non-illustrated image memory.

To perform the image forming operation, the image forming apparatus 1 operates as follows. The image forming device 12 forms a toner image on a recording sheet, an example of a recording medium, delivered from the sheet feeding device 14, on the basis of the image data generated through the document reading operation, image data stored in the image memory, or image data received from a computer connected via the network.

The fixing device 13 heats and presses the recording sheet on which the toner image has been formed by the image forming device 12, to thereby fix the toner image onto the recording sheet. The recording sheet that has undergone the fixing process is delivered to a non-illustrated output tray. The sheet feeding device 14 includes a sheet cassette. The cooling mechanism 15 includes cooling fans 151, and serves to cool a heater 21 (see FIG. 2), which will be subsequently described, provided in the fixing device 13.

Figure 2:
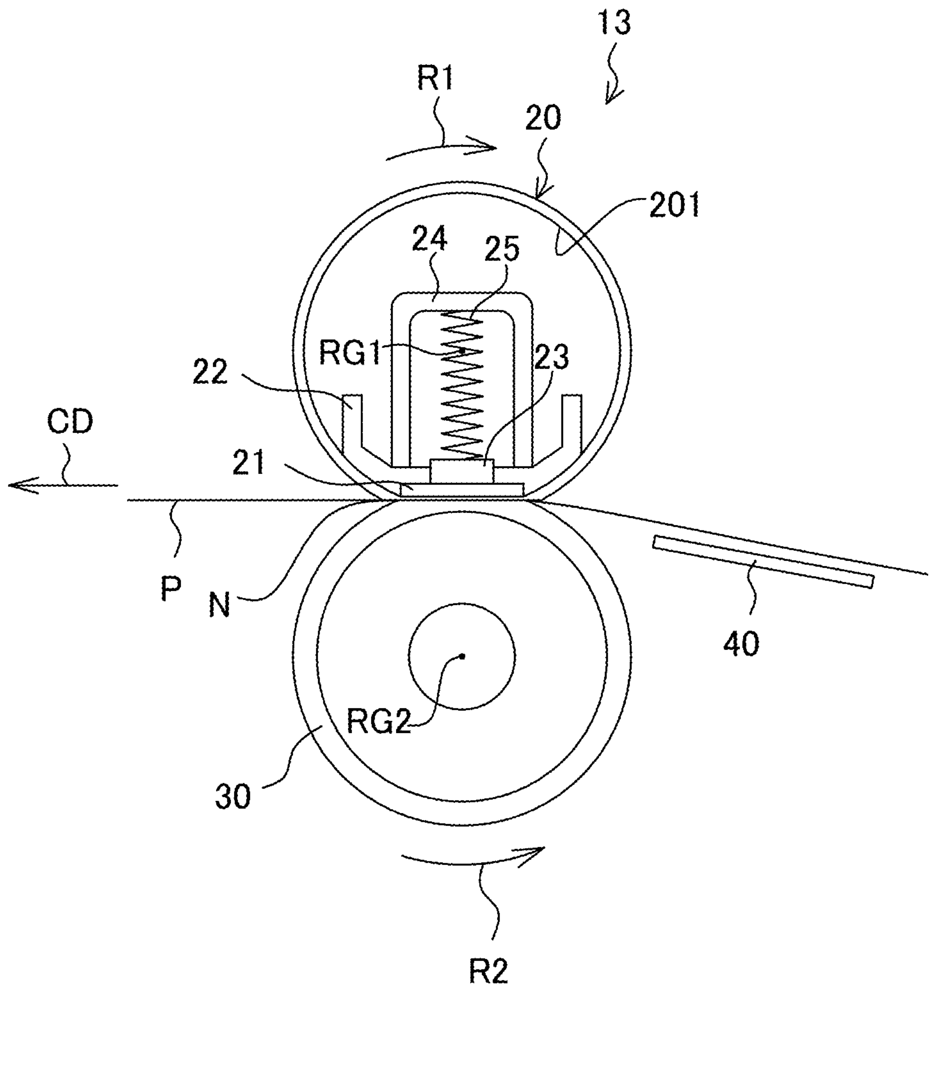
FIG. 2 is a schematic cross-sectional view showing an example of a fixing device provided in the image forming apparatus.

FIG. 2 is a cross-sectional view schematically showing an example of the fixing device 13. The fixing device 13 includes a fixing belt 20, a presser 30, the heater 21, a retainer 22, a temperature sensor 23, a reinforcer 24, a biasing element 25, and a transport guide 40.

The fixing belt 20 is a cylindrical, rotatable endless belt, and heats the recording medium (recording sheet P) on which the toner image has been formed. The fixing belt 20 extends in the direction of a first rotary shaft RG1, extending to the far side in FIG. 2, and is set to rotate about the first rotary shaft RG1.

The presser 30 is a roller extending in the direction of a second rotary shaft RG2, extending parallel to the first rotary shaft RG1, and set to rotate about the second rotary shaft RG2. The presser 30 causes the fixing belt 20 to rotate so as to follow the rotation of the presser 30, to thereby define a nip region N through which the recording sheet P serving as the recording medium passes, between the presser 30 and the fixing belt 20. The recording sheet P having the toner image formed thereon is guided by the transport guide 40, and pinched at the nip region N. An arrow CD in FIG. 2 indicates the transport direction of the recording sheet P.

The fixing belt 20 is made to rotate about the first rotary shaft RG1, in a first rotation direction R1 (clockwise in FIG. 2, which is the running direction of the fixing belt 20), so as to follow the rotation of the presser 30 about the second rotary shaft RG2, in a second rotation direction R2 (counterclockwise in FIG. 2).

The heater 21 heats the fixing belt 20. The heater 21 is a planar heater extending along the first rotary shaft RG1, and located inside the fixing belt 20 so as to oppose the inner circumferential surface 201 of the fixing belt 20. The heater 21 may be, for example, a ceramic heater having relatively low thermal capacity, and includes a ceramic substrate and a resistive heating element.

The retainer 22 retains the heater 21. The retainer 22 is formed of a heat-resistant resin material having a U-shaped cross-section, and extending in the direction of the first rotary shaft RG1.

The temperature sensor 23 is opposed to the heater 21, to detect the temperature of the heater 21. The temperature sensor 23 is inserted in a through hole formed in the retainer 22, and located in contact with the heater 21. The temperature sensor 23 may be, for example, a thermistor. Here, it is not mandatory that the temperature sensor 23 is in contact with the heater 21, but a non-contact type sensor may be adopted.

The reinforcer 24 is a metal stay having a cross-section of an inverted U-shape, and extending in the direction of the first rotary shaft RG1. The reinforcer 24 is fixed to the retainer 22, to reinforce the same.

The biasing element 25 is located between the temperature sensor 23 and the reinforcer 24, to bias the temperature sensor 23 in the direction from the temperature sensor 23 toward the heater 21. The biasing element 25 may be, for example, a coil spring.

Figure 3:
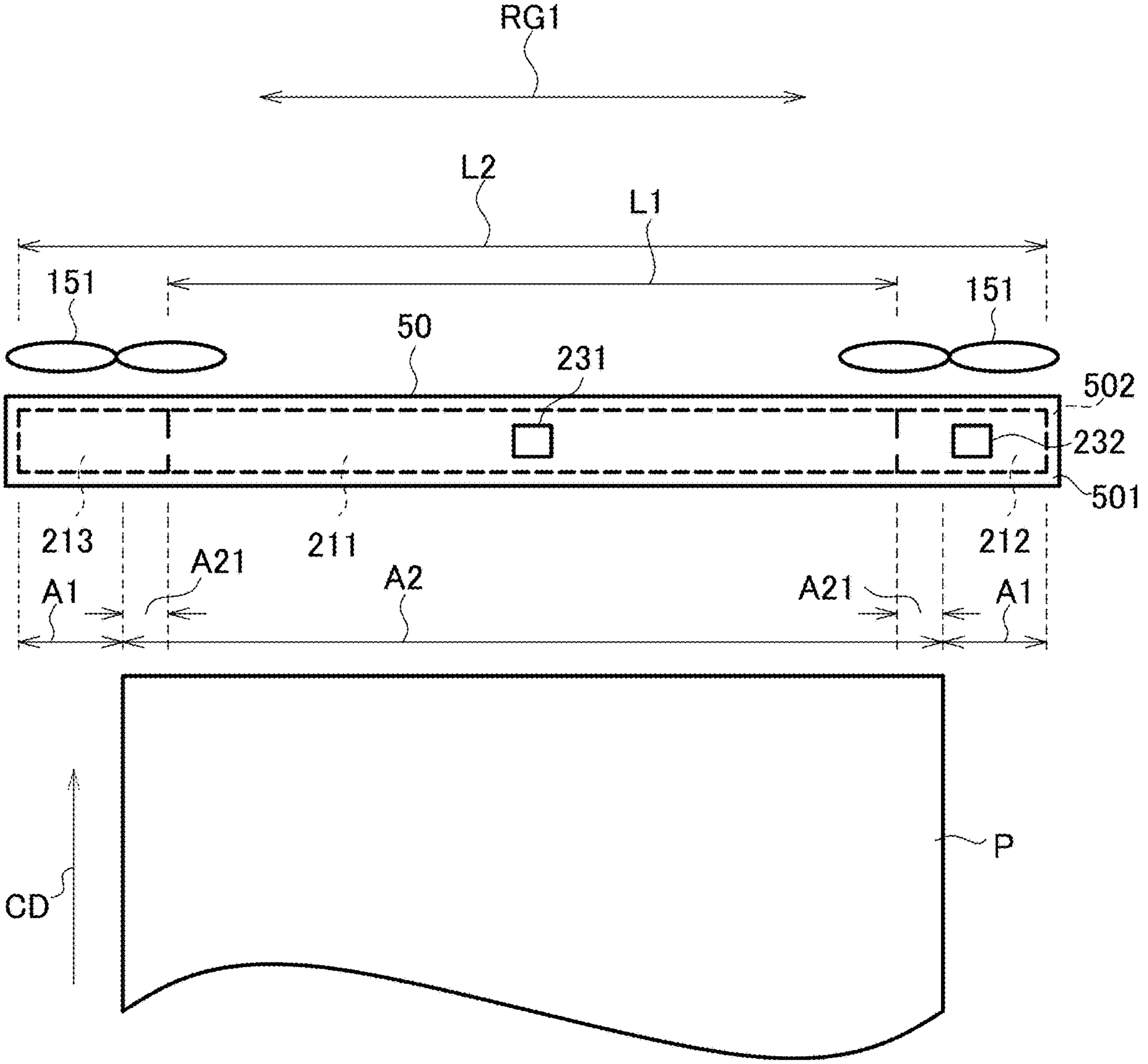
FIG. 3 is a schematic plan view showing a part of the fixing device and related parts.

FIG. 3 is a schematic plan view showing a part of the fixing device 13 and the related parts. A substrate 50 may be, for example, a ceramic substrate, having faces parallel to each other, and the back face serves as a heating surface 502.

On the heating surface 502, a main heater 211, a first sub heater 212, and a second sub heater 213 are provided. The heater 21 (see FIG. 2) is composed of the main heater 211, the first sub heater 212, and the second sub heater 213. The main heater 211 is located on the central portion of the fixing belt 20 in the width direction, orthogonal to the running direction of the fixing belt 20 and the transport direction of the recording sheet P. The first sub heater 212 and the second sub heater 213 are located on the respective end portions of the fixing belt 20, in the width direction.

The main heater 211 is located on the central portion of the substrate 50 in the direction along the first rotary shaft RG1, the first sub heater 212 is located on one end portion in the direction along the first rotary shaft RG1, and the second sub heater 213 is located on the other end portion in the direction along the first rotary shaft RG1.

A length L1 of the main heater 211 in the longitudinal direction (width direction) is, for example, 210 mm which is the size of the shorter sides of A4 size, most frequently used in the business situation. A length L2 between the outer end of the first sub heater 212 in the longitudinal direction (width direction), and the outer end of the second sub heater 213 in the longitudinal direction is, for example, approximately 20 mm longer than the shorter sides of A3 sides (297 mm).

The fixing device 13 includes the temperature sensor 23 that detects the temperature of the heater 21, as shown in FIG. 2. The temperature sensor 23 includes, as shown in FIG. 3, a first temperature sensor 231 that detects the temperature of the main heater 211, and a second temperature sensor 232 that detects the temperature of the first sub heater 212. Although the second temperature sensor 232 may also be provided for the second sub heater 213, this embodiment represents the case where the second temperature sensor 232 is only provided for the first sub heater 212. Accordingly, the first temperature sensor 231 is located at the position where the main heater 211 is located, in the width direction. The second temperature sensor 232 is located at the position where the first sub heater 212 is located, in the width direction.

The first temperature sensor 231 is located on a non-heating surface 501 of the substrate 50 (opposite to the heating surface 502), at the position opposite the main heater 211. The second temperature sensor 232 is located on the non-heating surface 501 of the substrate 50, at the position opposite the first sub heater 212.

A sheet passage region A2 corresponds to the region on the heater 21 (see FIG. 2) in the width direction, where the recording sheet P passes. A non-passage region A1 corresponds to the region on the heater 21 in the width direction, which the recording sheet P does not reach. In addition, a sheet passage region A21 corresponds to the region in the width direction, where the first sub heater 212 or second sub heater 213 is located, and where the recording sheet P passes.

The cooling fans 151 serve to cool the respective end portions of the heater 21 (see FIG. 2) in the direction along the first rotary shaft RG1 (i.e., entire region including the respective end portions of the region where the main heater 211 is located, and the regions where the first sub heater 212 and the second sub heater 213 are respectively located).

Figure 4:
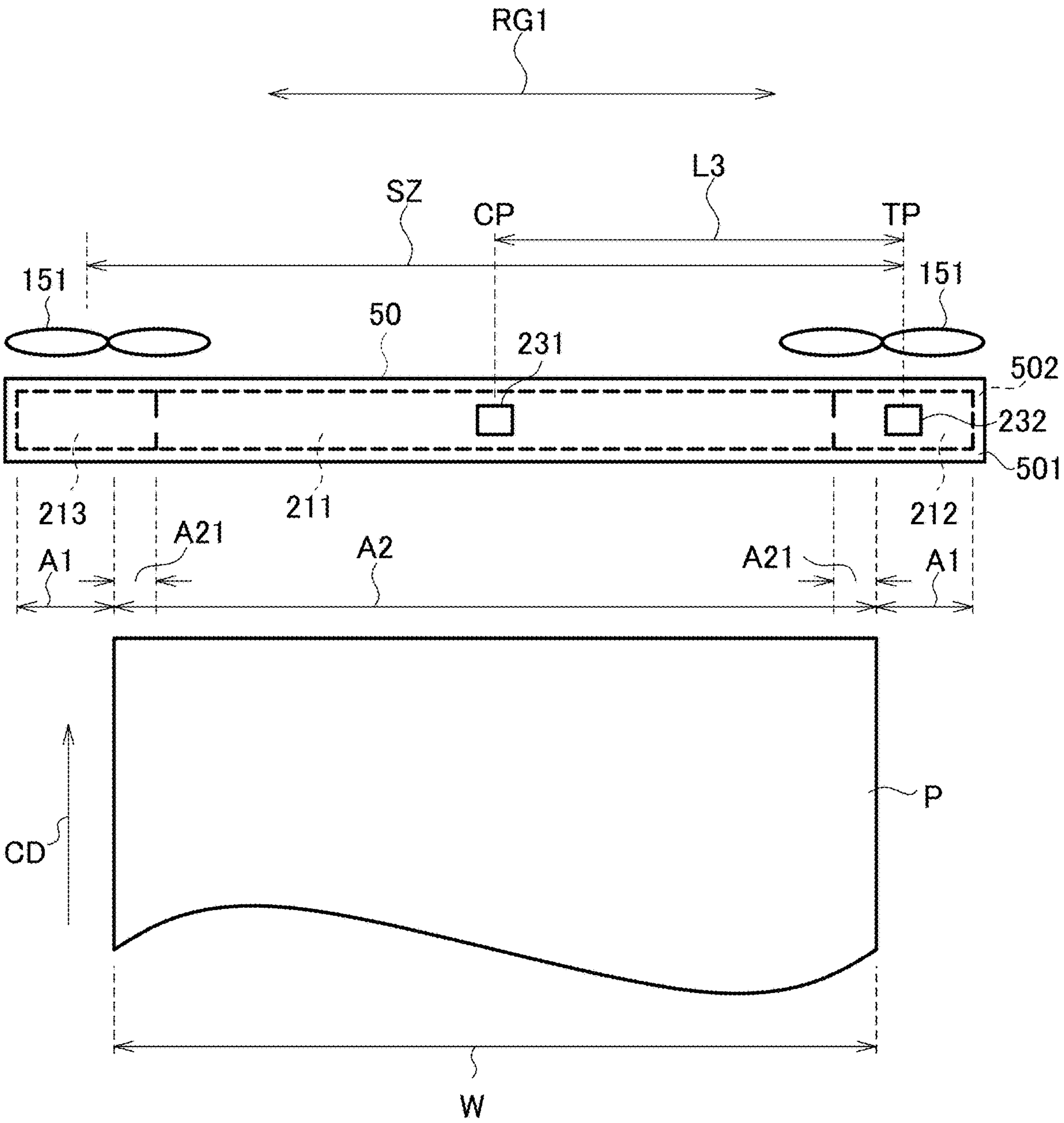
FIG. 4 is a schematic plan view for explaining the case where a recording medium does not pass a temperature detection position of a temperature sensor that detects the temperature of a sub heater.
Figure 5:
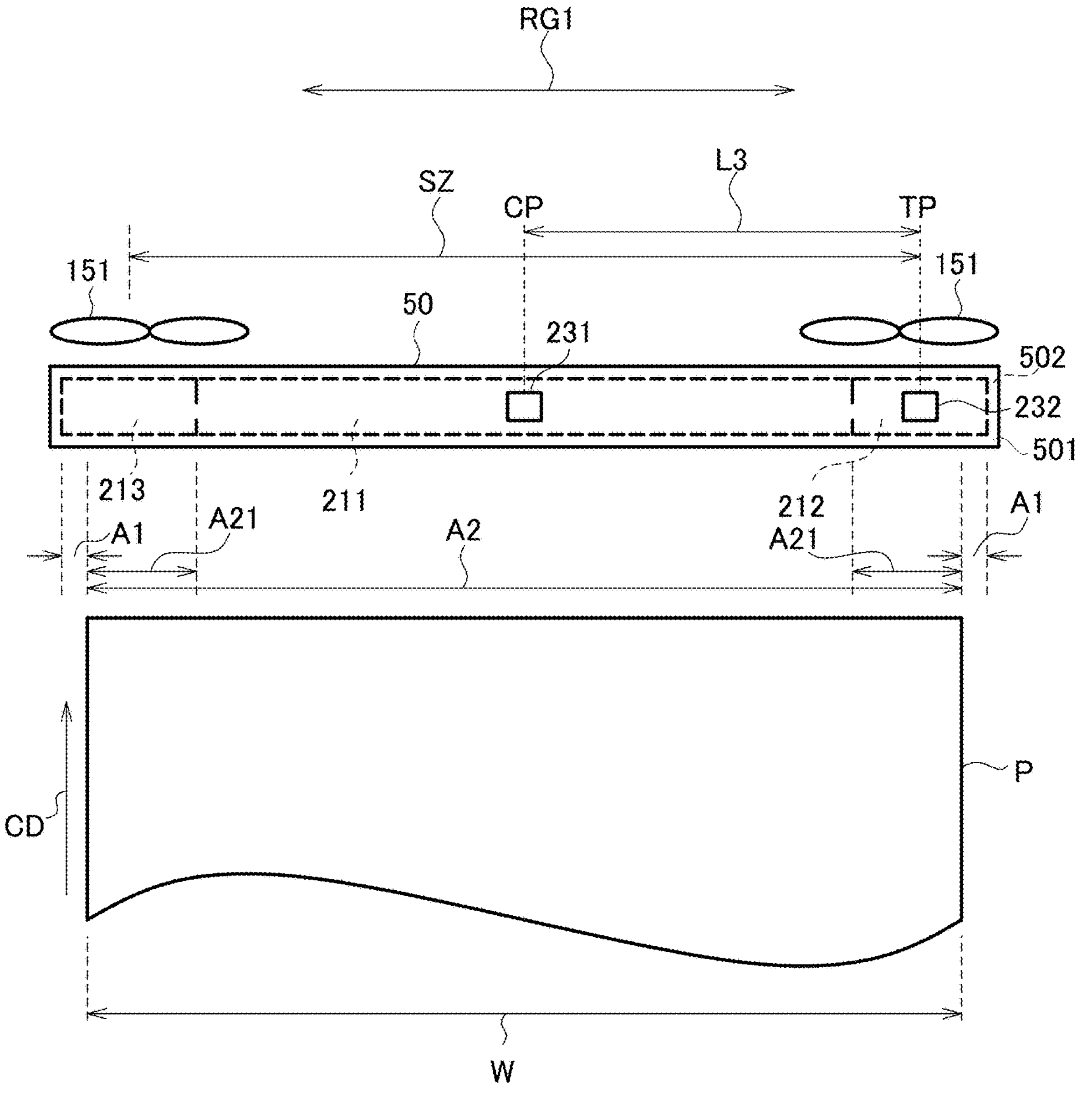
FIG. 5 is a schematic plan view for explaining the case where the recording medium passes the temperature detection position of the temperature sensor that detects the temperature of the sub heater.

FIG. 4 is a schematic plan view for explaining the case where the recording medium does not pass a temperature detection position of the second temperature sensor 232, in the width direction. FIG. 5 is a schematic plan view for explaining the case where the recording medium passes the temperature detection position of the second temperature sensor 232.

A length L3 corresponds to the distance between the central position CP of the main heater 211 in the direction along the first rotary shaft RG1 (width direction), and the temperature detection position TP of the second temperature sensor 232. A large size SZ is to be used for deciding whether the recording sheet P passes the temperature detection position TP, and corresponds to a minimum size in the width direction, of the recording sheet P that passes the temperature detection position TP of the second temperature sensor 232. For example, the large size SZ is set to a size twice as long as the length L3.

As shown in FIG. 4, when the size W of the recording sheet P in the width direction is smaller than the large size SZ, the recording sheet P does not reach the temperature detection position TP, in the width direction. In contrast, when the size W of the recording sheet P in the width direction is equal to or larger than the large size SZ as shown in FIG. 5, the recording sheet P reaches the temperature detection position TP, in the width direction.

Referring again to FIG. 1, the components of the image forming apparatus 1 will be described hereunder. The operation device 47 receives the user's instructions to execute the functions and operations that the image forming apparatus 1 is configured to perform, for example the image forming operation. The operation device 47 includes a display device 473 for displaying an operation guide for the user. The operation device 47 receives, through a touch panel provided on the display device 473, the user's instruction based on the touch operation performed by the user on the screen displayed on the display device 473.

The display device 473 is constituted of, for example, a liquid crystal display (LCD). The display device 473 is provided with the touch panel. When the user touches a button or a key displayed on the screen, a touch panel overlaid on the display device 473 receives the instruction corresponding to the touched position.

The storage device 8 is a large-capacity storage device such as a hard disk drive (HDD) or a solid-state drive (SSD), and contains various control programs.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 acts as a controller 100 and a setting device 101.

The control device 10 is configured to act as the controller 100 and the setting device 101, when the processor operates according to the control program stored in the storage device 8. Here, the controller 100 and the setting device 101 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the cooling mechanism 15, the sheet feeding device 14, the operation device 47, and the storage device 8, and controls the operation of the cited components. For example, the controller 100 executes some processings required for the image forming apparatus 1 to perform the image forming operation.

In addition, the controller 100 controls the main heater 211, such that a first detected temperature D1 from the first temperature sensor 231 accords with a predetermined first target temperature T1, which is the appropriate fixing temperature. Further, the controller 100 controls both of the first sub heater 212 and the second sub heater 213, such that a second detected temperature D2 from the second temperature sensor 232 accords with a predetermined second target temperature different from the first target temperature T1. The controller 100 also controls the operation of the cooling fan 151.

For example, the controller 100 controls the main heater 211 by a proportional integral differential (PID) control, to make the first detected temperature D1 accord with the first target temperature T1, and controls both of the first sub heater 212 and the second sub heater 213 by the PID control, to make the second detected temperature D2 accord with the second target temperature T2.

The setting device 101 sets the second target temperature T2 to a predetermined first set temperature PT1, when the size W of the recording sheet P in the width direction, orthogonal to the transport direction CD of the recording sheet P, is equal to or larger than the large size SZ. In contrast, when the size W of the recording sheet P in the width direction is a specific size, which is smaller than the large size SZ, and which allows the recording sheet P to reach the position corresponding to the first sub heater 212 in the width direction, the setting device 101 sets the second target temperature T2 to a predetermined second set temperature PT2, higher than the first set temperature PT1. The first set temperature PT1 corresponds to the predetermined appropriate fixing temperature (e.g., 180 degrees Celsius). The second set temperature PT2 corresponds to a predetermined temperature higher than the appropriate fixing temperature, which allows the temperature of the sheet passage region, covered with the recording sheet P that reaches the positions respectively corresponding to the first sub heater 212 and the second sub heater 213 in the width direction (in FIG. 4, sheet passage region A21), to be maintained at the appropriate fixing temperature (e.g., 180 degrees Celsius). Such predetermined temperature may be determined in advance through experiments, and installed in advance in the setting device 101.

The setting device 101 decides the size of the recording sheet transported to the fixing belt 20, on the basis of size of the recording sheet accommodated in the sheet feeding device 14, and stored in the controller 100. When the size of the recording sheet stores in the controller 100 is a predetermined size, which reaches the positions respectively corresponding to the first sub heater 212 and the second sub heater 213 in the width direction, the setting device 101 sets the second target temperature T2 to the second set temperature PT2. Here, the setting device 101 may set the second target temperature T2 to either of the first set temperature PT1 and the second set temperature PT2, according to an instruction inputted to the operation device 47.

Referring now to a flowchart shown in FIG. 6, an exemplary process of controlling the temperature of the fixing device 13, performed by the image forming apparatus 1, will be described hereunder. This operation is performed, for example, when the operation device 47 receives a copying instruction, and the image forming apparatus 1 executes the image forming operation on the recording sheet P. First, the setting device 101 sets the first target temperature T1 to the first set temperature PT1 (S1). Then the setting device 101 decides whether the size W in the width direction, of the recording sheet P to undergo the fixing operation, is equal to or larger than the large size SZ (S2).

Upon deciding that the size W of the recording sheet P in the width direction is smaller than the large size SZ, and that the recording sheet P has reached the position corresponding to the in the width direction, but has not reached the temperature detection position TP, as shown in FIG. 4 (NO at S2), the setting device 101 sets the second target temperature T2 to the second set temperature PT2 (S3). Further, the setting device 101 sets an operation start temperature TS of the cooling fan 151 to a temperature equal to or higher than the second set temperature PT2, or to a predetermined third set temperature PT3 higher than the second set temperature PT2 (S4).

The controller 100 starts to control the main heater 211 so as to make the first detected temperature D1 from the first temperature sensor 231 accord with the first target temperature T1 (i.e., first set temperature PT1) (S5), and starts to control the first sub heater 212 and the second sub heater 213, so as to make the second detected temperature D2 from the second temperature sensor 232 accord with the second target temperature T2 (i.e., second set temperature PT2) (S6). In the case where the second temperature sensor 232 is also provided for the second sub heater 213, the controller 100 controls the first sub heater 212 and the second sub heater 213 at S6, for example by adopting the average of the temperatures detected by the respective second temperature sensors 232 of the first sub heater 212 and the second sub heater 213, as the second detected temperature D2 from the second temperature sensor 232.

Then the controller 100 decides whether the second detected temperature D2 from the second temperature sensor 232 has become equal to or higher than the operation start temperature TS (second set temperature PT2 or third set temperature PT3) (S7). Upon deciding that the second detected temperature D2 has become equal to or higher than the operation start temperature TS (YES at S7), the controller 100 controls the cooling fan 151 so as to start the operation (S8).

The controller 100 then decides whether the image forming operation has finished (S9). In the case where the image forming operation has not finished (NO at S9), the operation returns to S5. The controller 100 continues with the control of the main heater 211 to make the first detected temperature D1 from the first temperature sensor 231 accord with the first target temperature T1 (i.e., first set temperature PT1) (S5), and the control of the first sub heater 212 and the second sub heater 213, to make the second detected temperature D2 from the second temperature sensor 232 accord with the second target temperature T2 (i.e., second set temperature PT2) (S6).

Figure 7A:
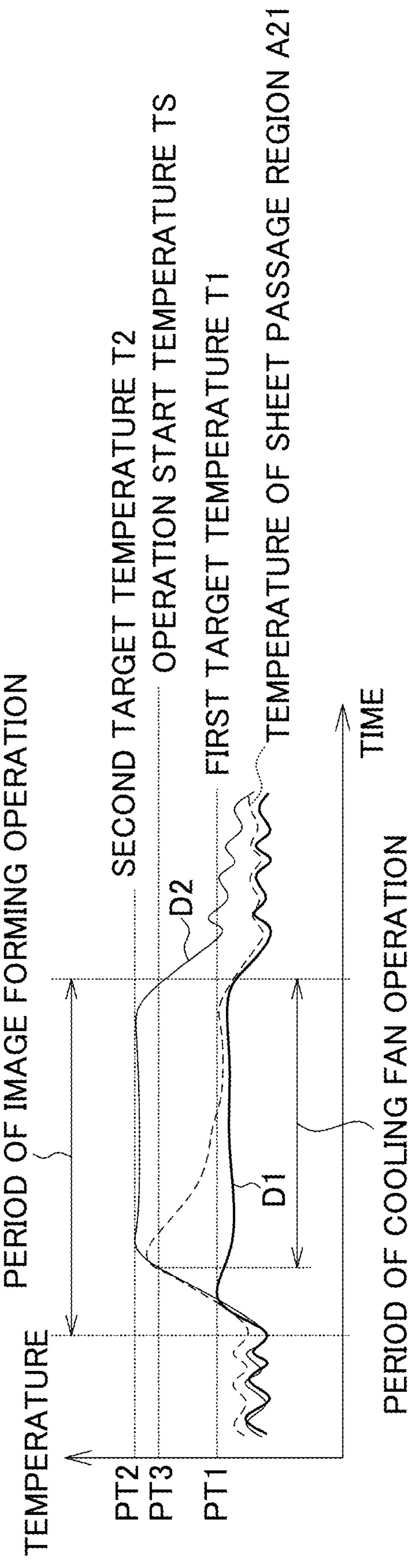
FIG. 7A is a graph showing an example of changes in temperature of a heater, observed when the recording medium does not pass the temperature detection position of the temperature sensor that detects the temperature of the sub heater.

FIG. 7A is a graph showing an example of changes in temperature of the heater 21, observed when the size W of the recording sheet P in the width direction is smaller than the large size SZ, and has reached the position corresponding to the first sub heater 212 in the width direction, in other words, as shown in FIG. 4, the recording sheet P does not pass the temperature detection position TP.

Solid lines (bold lines) in the graph indicate the variation of the first detected temperature D1 from the first temperature sensor 231 (temperature of the main heater 211). Because of the mentioned control of the main heater 211 by the controller 100, the temperature of the main heater 211 is maintained at the first set temperature PT1 (first target temperature T1), which is within the temperature range appropriate for the fixing operation, while the image forming operation is being performed.

Solid lines (fine lines) in the graph indicate the variation of the second detected temperature D2 from the second temperature sensor 232 (temperature of the non-passage region A1 of the first sub heater 212). Because of the mentioned control of the first sub heater 212 and the second sub heater 213 by the controller 100, the second detected temperature D2 is maintained at the second set temperature PT2 (second target temperature T2), and no excessive increase in temperature has been observed.

Broken lines in the graph indicate the variation of the temperature of the first sub heater 212 in the sheet passage region A21, which is unable to be detected by the second temperature sensor 232. Although the controller 100 controls both of the first sub heater 212 and the second sub heater 213 to make the second detected temperature D2 from the second temperature sensor 232 accord with the second target temperature T2, since the recording sheet P does not pass the temperature detection position of the second temperature sensor 232, the temperature detected by the second temperature sensor 232 becomes higher than the temperature of the sheet passage region A21. Accordingly, although the detected temperature from the second temperature sensor 232 is maintained at the second detected temperature D2, because of the control of both of the first sub heater 212 and the second sub heater 213 by the controller 100, to make the second detected temperature D2 from the second temperature sensor 232 accord with the second target temperature T2, the temperature of the sheet passage region A21 is lowered after the cooling fan 151 starts the operation, because the heat is removed by the recording sheet P passing the sheet passage region A21. Here, the second set temperature PT2 is the predetermined temperature that allows the temperature of the sheet passage region of the recording sheet P, which reaches the positions respectively corresponding to the first sub heater 212 and the second sub heater 213 in the width direction, to be maintained at the first target temperature T1 corresponding to the appropriate fixing temperature. Therefore, although the temperature of the sheet passage region A21 is lowered as described above, but still stays at the first target temperature T1 corresponding to the appropriate fixing temperature (see FIG. 7B). Thus, the temperature of the sheet passage region A21 is maintained at a temperature close to the first set temperature PT1 during the period of the image forming operation, in other words within the temperature range appropriate for the fixing operation. In the non-passage region A1 of the first sub heater 212 and the second sub heater 213, an excessive increase in temperature can be suppressed, by the airflow from the cooling fan 151.

Figure 7B:
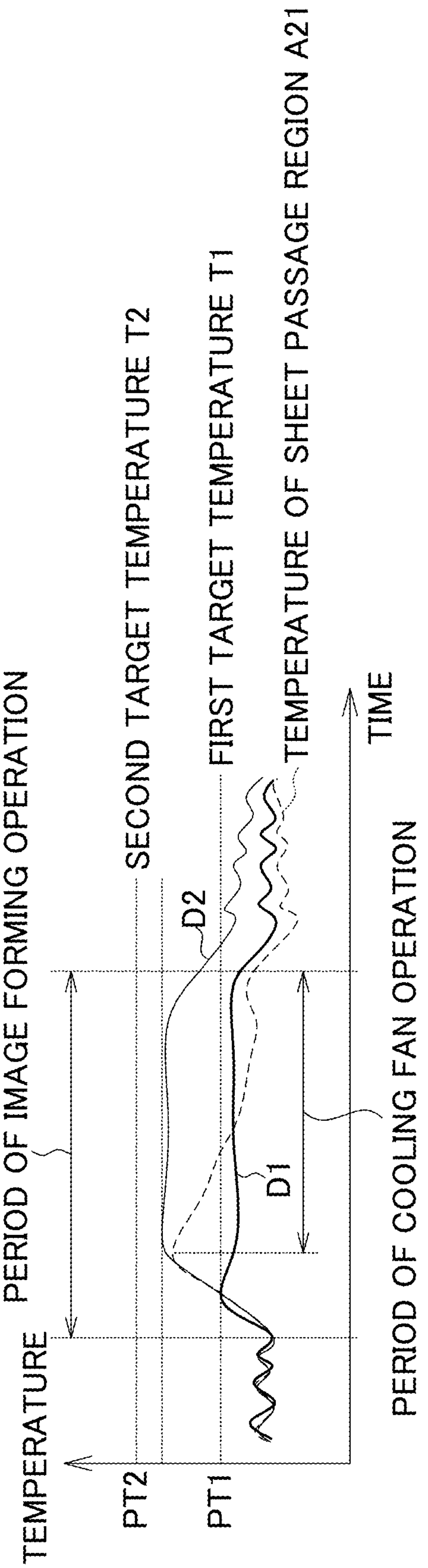
FIG. 7B is a graph showing a comparative example of the changes in temperature of the heater shown in FIG. 7A.

FIG. 7B is a graph showing a comparative example of the changes in temperature of the heater 21, observed when the recording sheet P does not pass the temperature detection position TP. In this case, the second target temperature T2' is determined simply by adjusting the second detected temperature D2 from the temperature sensor 232 to the second target temperature T2, without taking into account the temperature drop in the sheet passage region A21. Accordingly, the second target temperature T2' is set to a temperature lower than the second set temperature PT2. Therefore, the temperature of the sheet passage region A21 becomes too low, to a level lower than the first set temperature PT1 which is the appropriate fixing temperature, during the period of the image forming operation, thus to be deviated from the temperature range appropriate for the fixing operation.

According to this embodiment, as described above, the predetermined temperature, which is higher than the second target temperature T2' (temperature determined simply by adjusting the second detected temperature D2 from the temperature sensor 232 to the second target temperature T2, without taking into account the temperature drop in the sheet passage region A21), is adopted as the second set temperature PT2, for the purpose of maintaining the temperature of the sheet passage region A21 at a level close to the first set temperature PT1, in other words within the temperature range appropriate for the fixing operation, during the period of the image forming operation.

Figure 6:
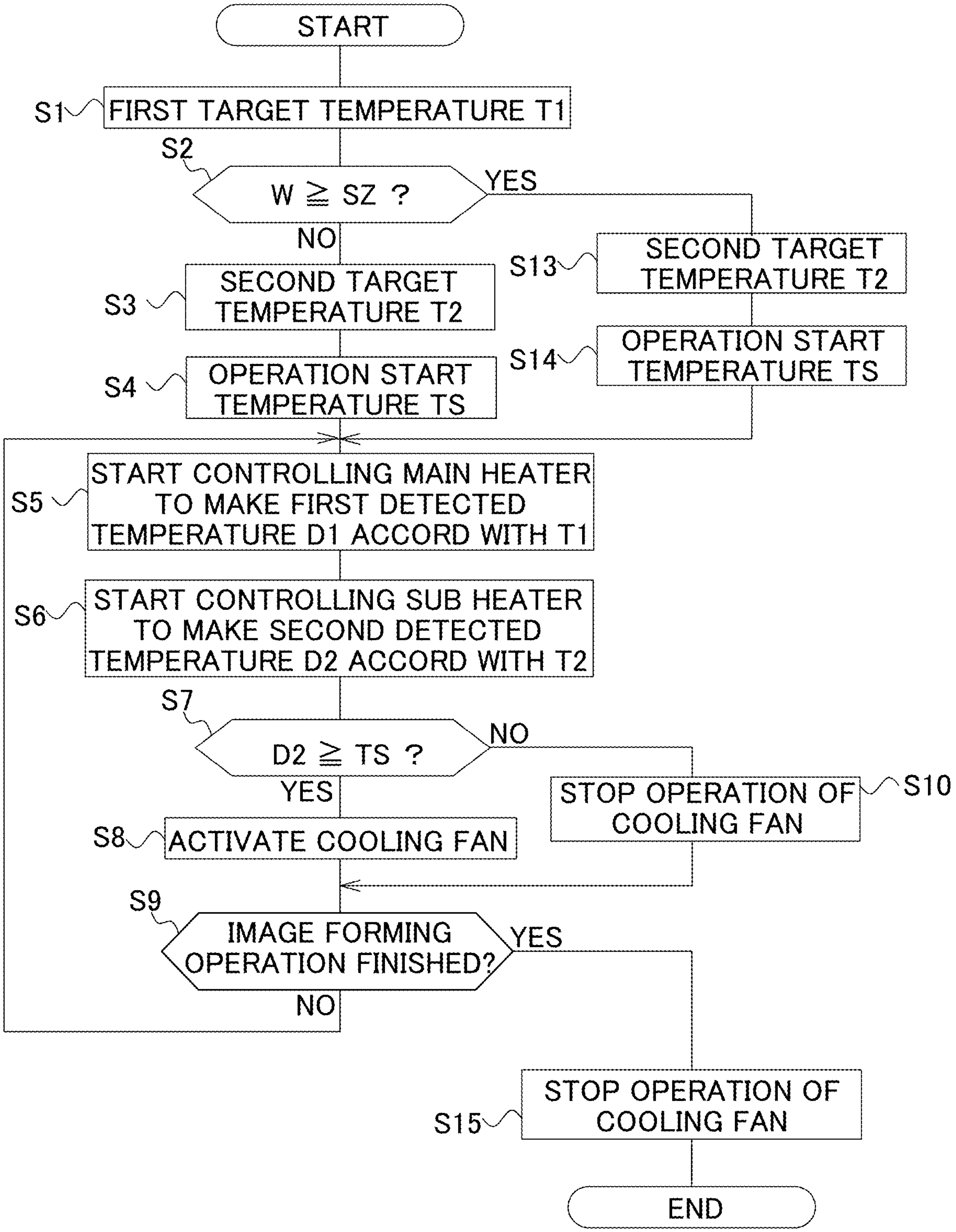
FIG. 6 is a flowchart showing an exemplary process of controlling the temperature of the fixing device, performed by a control device of the image forming apparatus.

Referring again to the flowchart shown in FIG. 6, in the case where the setting device 101 decides at S2 that the size W of the recording sheet P in the width direction is equal to or larger than the large size SZ (YES at S2), the setting device 101 sets the second target temperature T2 to the first set temperature PT1 (S13), and sets the operation start temperature TS of the cooling fan 151 to the first set temperature PT1 (S14).

The controller 100 then controls the main heater 211, to make the first detected temperature D1 from the first temperature sensor 231 accord with the first target temperature T1 (i.e., first set temperature PT1) (S5), and controls the first sub heater 212 and the second sub heater 213, to make the second detected temperature D2 from the second temperature sensor 232 accord with the second target temperature T2 (i.e., second set temperature PT2) (S6).

Then the controller 100 decides whether the second detected temperature D2 from the second temperature sensor 232 has become equal to or higher than the operation start temperature TS (in this case, second set temperature PT2) (S7). Upon deciding that the second detected temperature D2 has become equal to or higher than the operation start temperature TS (YES at S7), the controller 100 keeps the cooling fan 151 in operation (S8), but stops the operation of the cooling fan 151 (S10), upon deciding that the second detected temperature D2 is lower than the operation start temperature TS (NO at S7). Thereafter, the operation proceeds to S9.

Figure 8:
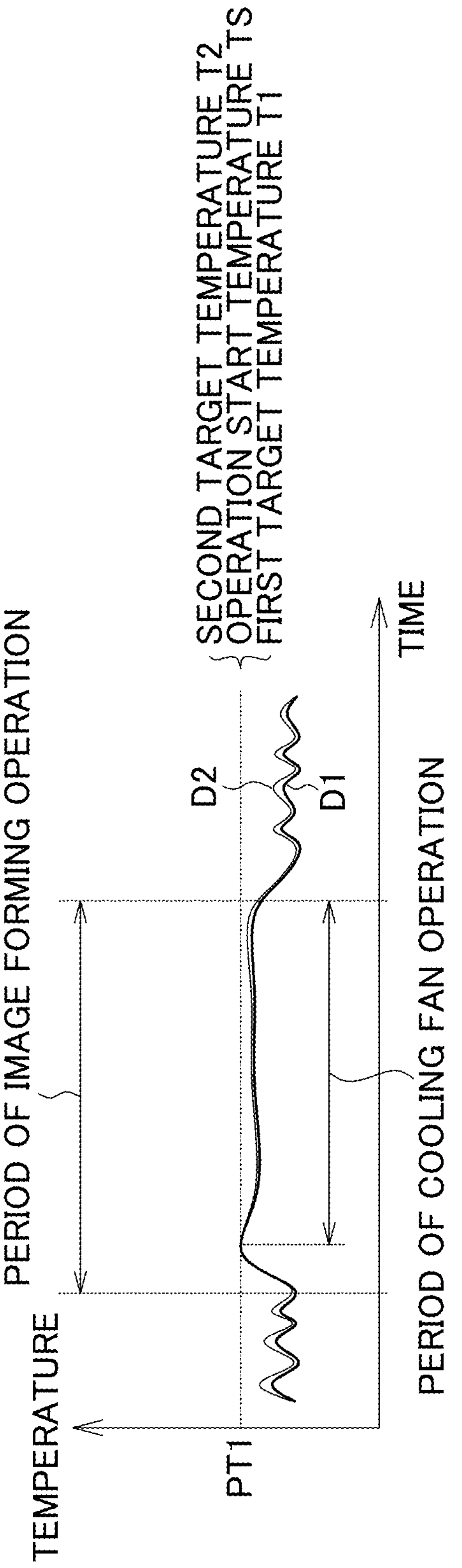
FIG. 8 is a graph showing an example of changes in temperature of the heater, observed when the recording medium passes the temperature detection position of the temperature sensor that detects the temperature of the sub heater.

FIG. 8 is a graph showing an example of changes in temperature of the heater 21, observed when the size W of the recording sheet P in the width direction is equal to or larger than the large size SZ, in other words when the recording sheet P reaches the temperature detection position TP in the width direction, as shown in FIG. 5.

Solid lines (bold lines) in the graph indicate the variation of the first detected temperature D1 from the first temperature sensor 231 (temperature of the main heater 211). The temperature of the main heater 211 is maintained close to the first set temperature PT1 (first target temperature T1) during the period of image forming operation, in other words within the temperature range appropriate for the fixing operation.

Solid lines (fine lines) in the graph indicate the variation of the second detected temperature D2 from the second temperature sensor 232 (temperature of the sheet passage region A21 of the first sub heater 212). The temperature of the sheet passage region A21 of the first sub heater 212 is maintained close to the first set temperature PT1 (second target temperature T2) during the period of image forming operation, in other words within the temperature range appropriate for the fixing operation.

The second sub heater 213 is under the same environmental condition as the first sub heater 212, and therefore the temperature of the sheet passage region A21 of the second sub heater 213 is also maintained close to the first set temperature PT1, which is within the temperature range appropriate for the fixing operation. In the non-passage region A1 of the first sub heater 212 and the second sub heater 213, an excessive increase in temperature can be suppressed, by the airflow from the cooling fan 151.

When the controller 100 decides at S9 in FIG. 6, that the image forming operation has finished (YES at S9), the temperature controlling operation is finished. In the case where the cooling fan 151 is still in operation at this point, the controller 100 stops the operation of the cooling fan 151 (S15).

With the arrangement according to the foregoing embodiment, when the size W of the recording sheet P in the width direction is smaller than the large size SZ, but the recording sheet P reaches the position corresponding to the first sub heater 212 in the width direction, the temperature of the sheet passage region A21 of the first sub heater 212 and the second sub heater 213 can be maintained at the appropriate fixing temperature, while suppressing an excessive increase in temperature of the fixing device 13, with the airflow from the cooling fan 151. With the arrangement according to the embodiment, therefore, in the fixing device 13 including the main heater 211, the first sub heater 212, and the second sub heater 213 aligned along the width direction, the fixing device 13 can be properly heated to the temperature appropriate for the fixing operation, by the first sub heater 212 and the second sub heater 213.

As another embodiment, the cooling mechanism 15 may be configured such that the airflow from the cooling fan 151 becomes stronger, toward an outer side in the width direction, in other words in the direction along the first rotary shaft RG1 of the heater 21. For example, a duct that leads the airflow from the cooling fan 151 to the heater 21 may be designed according to the distance between the air outlet of the duct and the heater 21, to vary the strength of the airflow. To be more specific, stronger airflow from the cooling fan 151 may be provided to the non-passage region A1, where the temperature has to be lowered, and the airflow from the cooling fan 151 may be weakened, to the sheet passage region A21 where it is unnecessary to lower the temperature.

When the heater including the main heater and the sub heaters arranged along the width direction of the recording sheet is employed, in general, the end portions of the recording medium in the width direction can be efficiently heated. However, when the size of the recording medium passing the fixing device is relatively small, the central portion of the nip region of the fixing device in the direction along the rotary shaft of the fixing belt (i.e., width direction orthogonal to the running direction of the fixing belt and the transport direction of the recording medium) corresponds to the sheet passage region where the recording medium passes. In contrast, the region heated by the sub heater, on the outer side of the sheet passage region, corresponds to the non-passage region where the recording medium does not pass.

When the recording medium passes the fixing device, the heat of the fixing device is removed by the recording medium. Accordingly, in the case where the recording medium of a small size passes the fixing device, a difference in temperature is created between the central region (sheet passage region) where the heat is removed by the recording medium, and the end portions (non-passage region) where the heat is barely removed by the recording medium. As result, an excessive increase in temperature is prone to be incurred, in the end portions of the fixing device.

The excessive increase in temperature of the fixing device can be suppressed, by providing a cooling fan for lowering the temperature of the heater located in the region where the excessive increase in temperature is taking place. However, in the case where the size of the recording medium is the specific size, which reaches the position of the sub heater in the width direction, but does not reach the temperature detection position of the second temperature sensor that detects the temperature of the sub heater, controlling the heater on the basis of the detected temperature from the second temperature sensor may lead to an excessive temperature drop in the sheet passage region, where the recording medium that reaches the position of the sub heater in the width direction removes the heat. As result, the fixing operation may fail to be properly performed.

The arrangement according to the foregoing embodiment, in contrast, enables the fixing device, including the main heater and the sub heaters aligned in the width direction, orthogonal to the running direction of the fixing belt, to properly set the temperature appropriate for the fixing operation, with the sub heaters.

The disclosure may be modified in various manners, without limitation to the configuration according to the foregoing embodiments. Further, the configurations and processings described in the embodiments with reference to FIG. 1 to FIG. 8 are merely exemplary, and in no way intended to limit the disclosure to those configurations and processings.

While the present disclosure has been described in detail with reference to the embodiments thereof, it would be apparent to those skilled in the art that various changes and modifications may be made therein within the scope defined by the appended claims.

What is claimed is:

1. An image forming apparatus comprising:

a fixing device including:

a fixing belt having a cylindrical shape, and set to rotate;

a presser opposed to the fixing belt, so as to define a nip region between the presser and the fixing belt, through which a recording medium to undergo a fixing operation passes; and a heater extending in a width direction, orthogonal to a rotation direction of the fixing belt, and configured to heat the fixing belt, the heater including a main heater and two sub heaters, divided in the width direction, the main heater being located at a central portion of the fixing belt in the width direction, and the two sub heaters being located on respective end portions of the fixing belt in the width direction;

a first temperature sensor that detects a temperature of the main heater;

a second temperature sensor that detects a temperature of at least one of the sub heaters;

a cooling mechanism including a cooling fan, and configured to cool the end portions of the heater in the width direction;

a controller that controls operation of the cooling fan, controls the main heater so as to adjust a first detected temperature, detected by the first temperature sensor while the cooling fan is operating, to a predetermined first target temperature which is an appropriate fixing temperature, and controls the sub heaters so as to adjust a second detected temperature, detected by the second temperature sensor while the cooling fan is operating, to a predetermined second target temperature; and a setting device that sets the second target temperature to a predetermined first set temperature, when the recording medium is a large size that reaches a temperature detection position of the second temperature sensor, in the width direction orthogonal to a transport direction of the recording medium, and sets the second target temperature to a predetermined second set temperature higher than the first set temperature, when a size of the recording medium in the width direction is a specific size that reaches a position corresponding to the sub heater in the width direction, but does not reach the temperature detection position of the second temperature sensor in the width direction, wherein the second set temperature corresponds to a predetermined temperature at which the temperature of a sheet passage region of the recording medium reaching the position corresponding to the sub heaters in the width direction is maintained at the appropriate fixing temperature.

2. The image forming apparatus according to claim 1, further comprising a sheet feeding device that accommodates therein a recording sheet serving as the recording medium, wherein the setting device decides the size of the recording medium being transported by the fixing belt, on a basis of the size of the recording sheet accommodated in the sheet feeding device, and stored in the controller.

3. The image forming apparatus according to claim 1, wherein, in a case where the size of the recording medium in the width direction is the specific size, the controller activates the cooling fan, when the second detected temperature reaches a predetermined third set temperature, higher than the second set temperature.

4. The image forming apparatus according to claim 1, wherein the cooling mechanism is configured to increase a strength of airflow from the cooling fan, toward an outer side in the width direction of the heater.

* * * * *